US011401065B2

(12) United States Patent
Case et al.

(10) Patent No.: US 11,401,065 B2
(45) Date of Patent: Aug. 2, 2022

(54) METHOD FOR EASE IN IDENTIFYING PARTICULAR BUNDLES OF PRINTED CARDS WHILE PACKING AND UNPACKING THE BUNDLES

(71) Applicant: XEROX CORPORATION, Norwalk, CT (US)

(72) Inventors: Hans Franklin Case, Jordan, MN (US); Douglas K Herrmann, Webster, NY (US); Kevin St Martin, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 941 days.

(21) Appl. No.: 16/180,049

(22) Filed: Nov. 5, 2018

(65) Prior Publication Data

US 2019/0347587 A1    Nov. 14, 2019

Related U.S. Application Data

(60) Provisional application No. 62/670,164, filed on May 11, 2018.

(51) Int. Cl.
| | | |
|---|---|---|
| *B65B 25/14* | (2006.01) | |
| *B65B 5/06* | (2006.01) | |
| *B65B 27/08* | (2006.01) | |
| *B65B 53/00* | (2006.01) | |
| *B65B 63/00* | (2006.01) | |

(52) U.S. Cl.
CPC ............ *B65B 25/141* (2013.01); *B65B 5/068* (2013.01); *B65B 27/08* (2013.01); *B65B 53/00* (2013.01); *B65B 63/00* (2013.01); *B65B 63/005* (2013.01)

(58) Field of Classification Search
CPC ..... B65B 25/14; B65B 25/141; B65B 25/143; B65B 27/08; B65B 35/50; B65B 63/00; B65B 63/005; B65D 85/62; B41F 13/54; B65H 33/04; B65H 2701/18269; G03G 15/655; G03G 2215/00814; G03G 2215/00894; G03G 2215/00902; G09F 2003/0226
USPC ...... 53/399, 428, 435, 441, 447, 111 R, 520, 53/540, 542, 556, 582; 206/449, 499; 283/37, 70
See application file for complete search history.

(56) References Cited

U.S. PATENT DOCUMENTS

| | | | | |
|---|---|---|---|---|
| 1,696,999 | A | * | 1/1929 | Cannon .................. B65H 33/00 101/216 |
| 3,982,453 | A | * | 9/1976 | D'Amato et al. ...... B41F 13/64 53/520 |
| 5,085,417 | A | * | 2/1992 | Copham ................. B41F 13/54 270/58.08 |

(Continued)

*Primary Examiner* — Stephen F. Gerrity
(74) *Attorney, Agent, or Firm* — William A. Henry, II

(57) ABSTRACT

A workflow process for packing and unpacking variable sized bundles of printed card signs includes providing identifiable codes that make the card signs highly visible and recognizable. Included on selected card signs is a color coded border with indexing added to each bundle in groupings to help in packing and unpacking the bundles into and from boxes. When the bundles are packed in a box on edge, both the person packing and unpacking the box can easily identify the beginning and end of each bundle and thereby limiting the time required to organize and process the bundles and reduce labor cost and errors.

11 Claims, 5 Drawing Sheets

(56) References Cited

U.S. PATENT DOCUMENTS

| | | | | |
|---|---|---|---|---|
| 5,107,656 A | * | 4/1992 | Katz et al. | B65B 25/141 53/284.3 |
| 5,243,394 A | * | 9/1993 | Matsuno et al. | G03G 15/6552 347/2 |
| 5,308,120 A | * | 5/1994 | Thompson | B42D 15/00 283/70 |
| 8,302,851 B2 | * | 11/2012 | Horn et al. | G06Q 10/00 235/383 |
| 8,806,787 B2 | * | 8/2014 | Engelby et al. | G09F 3/0288 101/24 |
| 9,376,286 B1 | * | 6/2016 | Browning et al. | G09F 3/02 |
| 9,475,267 B2 | | 10/2016 | Herrmann et al. | |
| 2005/0000842 A1 | * | 1/2005 | Timmerman et al. | B65B 27/08 53/399 |
| 2014/0367956 A1 | * | 12/2014 | Wilkinson et al. | G06Q 30/02 412/8 |
| 2018/0141229 A1 | | 5/2018 | Henmann et al. | |

\* cited by examiner

METHOD FOR EASE IN IDENTIFYING PARTICULAR BUNDLES OF PRINTED CARDS WHILE PACKING AND UNPACKING THE BUNDLES

REFERENCE TO PROVISIONAL APPLICATION

The present Application claims priority from U.S. Provisional Application Ser. No. 62/670,164, filed May 11, 2018.

BACKGROUND

The present disclosure relates to an apparatus and method for improving process flow for packing and unpacking bundles of printed materials, and more particularly, to an easier way to organize sign bundles produced by a printer production system.

A process for creating adhesive signage for in-store shelving is shown in U.S. Pat. No. 9,475,267 B2. Currently, hundreds of thousands of unique variable sized bundles of signs are generated on a weekly basis by managed print services in reproduction centers for end users that are manually packed disorganized by operators and shipped to end locations for unpacking and further processing. As an example, variable sized bundles of signs are presently printed at a reproduction center and shipped to a nationwide department store chain end user that includes shelving in approximately 20,000 aisles onto which the printed signs are to be attached. In order for this to be accomplished, the bundles received from the reproduction center disorganized must be unpacked, sorted for respective departments within each store location, for example, cosmetics, shoes, etc., and each aisle within each respective department of each store location and positioned on shelving within each department. With the bundles being disorganized, this procedure is very labor intensive, time consuming and costly.

Therefore, there is a need for an improvement in managing the packing and unpacking of sign bundles that are intended to be processed subsequently in sequential order groupings.

SUMMARY

Accordingly, in answer to this need, an improved workflow process is disclosed herein that produces unique, variable sized sign bundles that can be identified by codes that make them highly visible and recognizable. A color coded border with indexing is added to each sign bundle to help in the packing and unpacking of boxed sign bundles. When the sign bundles are packed in a box on edge with the color code showing, both the person packing and unpacking the box can easily identify the beginning and end of each bundle to expedite further processing of the bundles and, thus, reduce labor cost and errors by limiting the time required to organize and process the bundles.

BRIEF DESCRIPTION OF THE DRAWINGS

Various of the above-mentioned and further features and advantages will be apparent to those skilled in the art from the specific article or methods described in the example(s) below, and the claims. Thus, they will be better understood from this description of these specific embodiment(s), including the drawing figures (which are approximately to scale) wherein:

DETAILED DESCRIPTION OF THE PREFERRED EMBODIMENT

Figure 1:
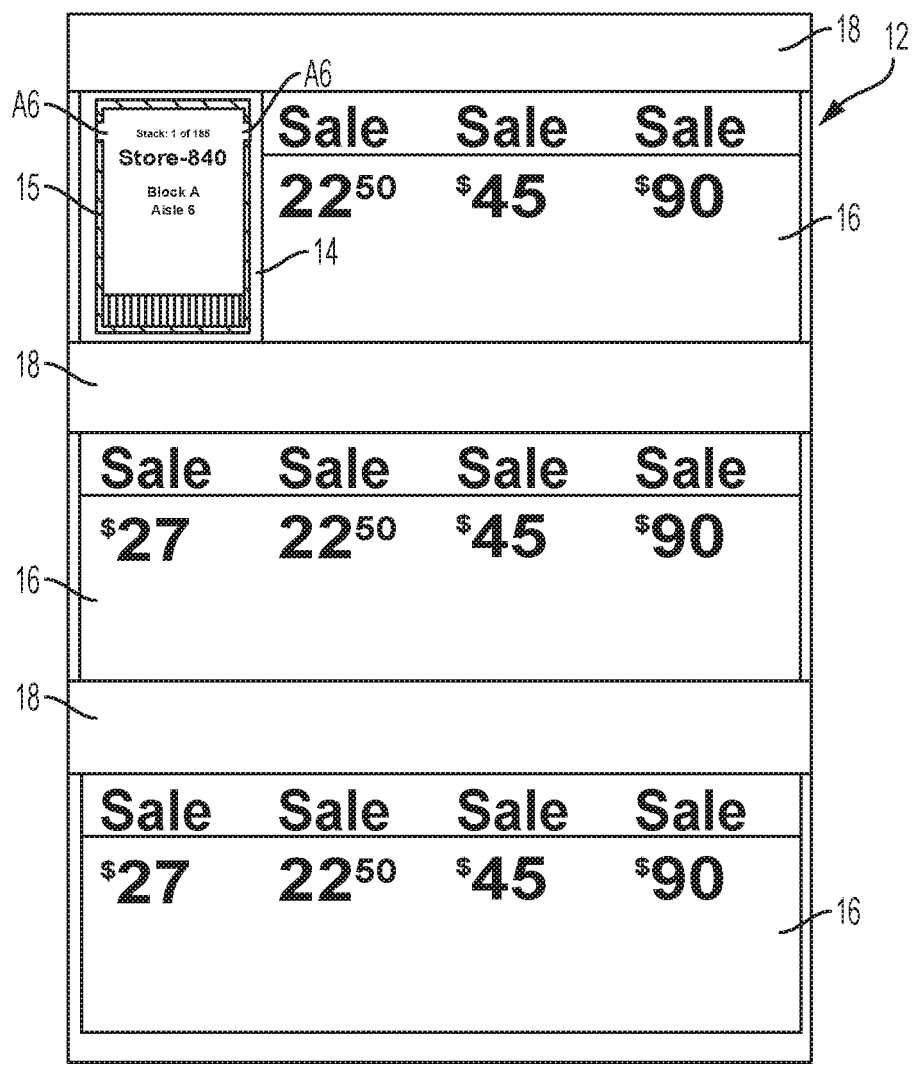
FIG. 1 is a front view of a substrate on which sales strip images of several cards are printed with an imbedded color image on an outer edge thereof.

For a general understanding of the features of the disclosure, reference is made to the drawings. In the drawings, like reference numerals have been used throughout to identify identical elements.

In accordance with the present disclosure, an improved process is disclosed that uses printing to easily identify bundles of card signs. A front view of a page or sheet 12 onto which sales strip images of several cards are printed is shown in FIG. 1 that is to be cut into several individual cards. An imbedded image is included in an outer edge of sheet 12 that indicates a store and department within the store that will receive the sales strip images. The imbedded image also includes indexing A6 that is added to card bundles in groupings indicating the aisle location for sales strip placement. Sheet 12 includes a cross-hatching pattern 15 as shown, but could include a different indicia, such as a colored border, or the like, if preferred. Sheet 12 also includes paper 16 on which sales strip images of several cards are printed, a permanent adhesive (not shown), a clear polymer carrier 18 that adds strength to the sheet, a pressure sensitive adhesive (not shown) and a release liner (not shown). The sales strip images on paper 16 are configured to not extend into predetermined areas of clear polymer 18 in order to allow that portion of clear polymer 18 to be used for attaching to store shelving.

Figure 2:
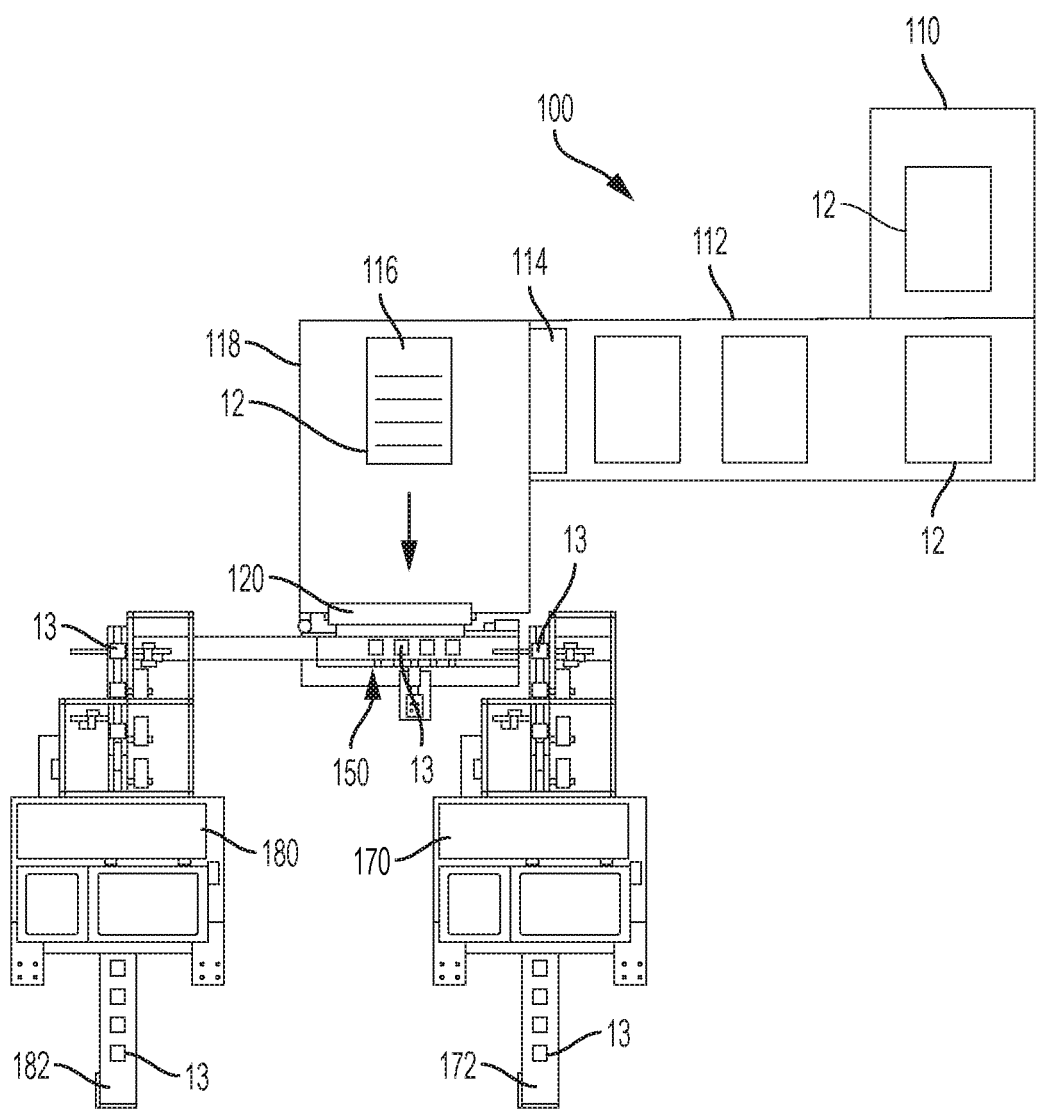
FIG. 2 is a plan view of a collation system with dual push collation and dual banders in parallel.

An example of a collation system 100 that can be used to cut sheets or pages of card signs into individual cards is shown in FIG. 2 in which card sheets 12 are directed into multiple bins and pushed out of the bins into dual banders. Card sheets 12 are outputted from a conventional printer, such as, the Xerox iGen® 110 onto a conveyor 112 positioned lengthwise and forwarded into a slitter 114 that is movable between cutting and non-cutting positions. In the cutting position slitter 114 places slits 116 across a portion of card sheets 12 and conveyor 118 conveys the sheets into a second cutter 120 which then cuts the card sheets into individual cards 13 and forwards them into a collection station 150 that includes four bins. The cards are alternately pushed in sets from the bins into a first bander 170 or a second bander 180. Card sets are outputted from bander 170 onto conveyor 172 and bander 180 employing conveyor 182 to present card sets for pickup at both conveyors by an operator and boxed. Suitable cutters are disclosed in U.S. Publication No. 2018-0141229, which is included herein by reference.

Figure 3:
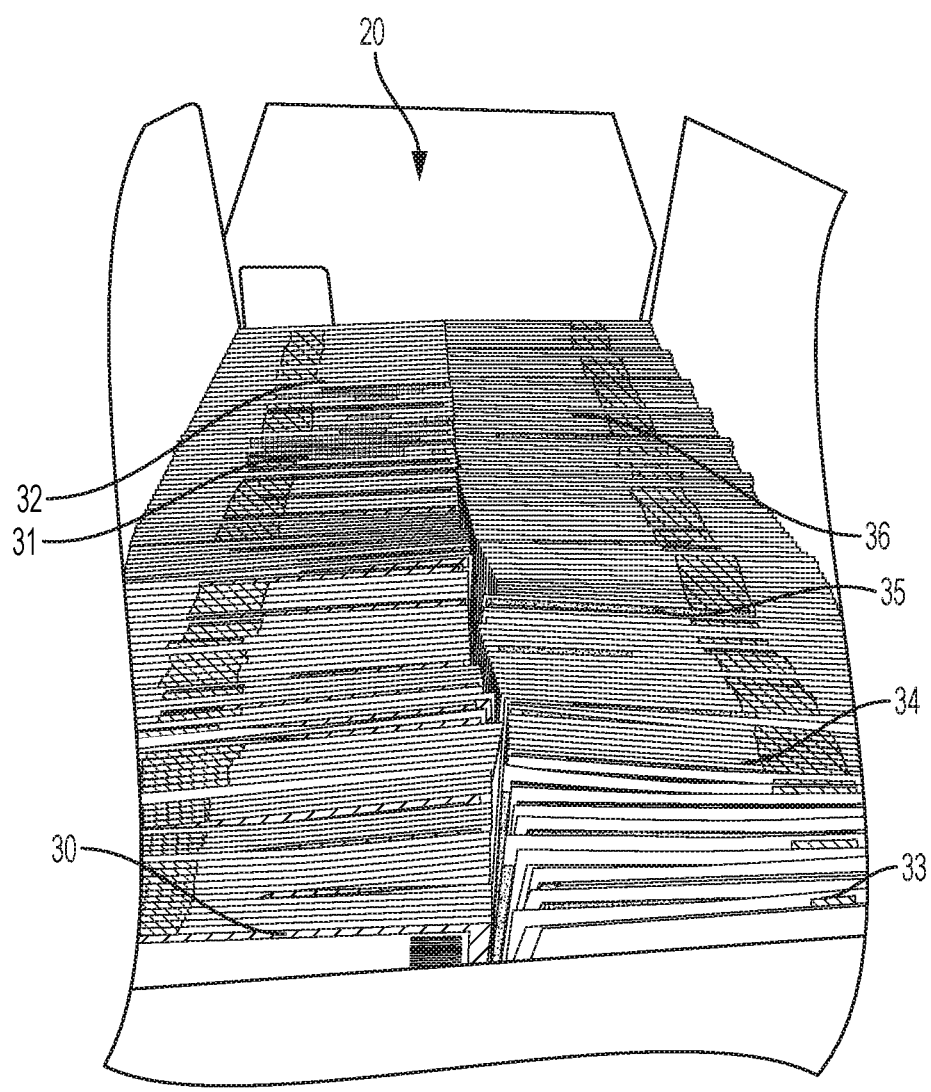
FIG. 3 is a perspective view of printed sheets of signs inserted into a box in color coded bundles.

A perspective view illustration in FIG. 3 shows a box 20 that includes bundles of cards 13 printed by printer 110 which includes software that facilitates printing to and placing markings 14 on an edge of 13. The markings on the cards are used for organizing the cards into groups and placing them into box 20 on edge with the markings showing to make the markings easily seen. The printed markings make the entire process easier from a standpoint of organizing the cards into sign bundles as they come out of a printer, such as, printer 110 and packing them for shipping to the person unpacking and processing the packaged bundles of card signs at a store. Variable sized bundled groupings of cards are shown in box 20 delineated by cross-hatched bordering 30-36 used to further differentiate between bundle groupings and make packing and unpacking a less time consuming processes. The bundled groupings of cards could alternatively include color coded borders, if desired. For example, as shown on the left side of box 20, first groupings of cards with cross-hatching could be replaced with a first dark blue color incorporated into the border of each group positioned behind reference line 30 and extend to the beginning of second groupings of signs behind a second border color yellow at reference line 31. A third grouping of cross-hatched cards beginning at reference line 32 and extending to an end of box 20 could be coded with a third color purple border. On a right side of box 20, first groupings of cards are shown cross-hatched, but could include a fourth color black coded into their border edges beginning at reference line 33 and second groupings of cross-hatched cards could be color coded with a fifth color dark green beginning at reference line 34. Third groupings of cross-hatched cards could include a sixth border color light green code beginning at reference line 35 and ending at reference line 36. Cross-hatching of fourth groupings of cards could be color coded with a seventh border color of dark purple and positioned behind reference line 36. The border edges are highly visible and recognizable which speeds up sorting and lessens errors in sorting. Also, with the cards packed on their edges with their edges color coded the task of packing and unpacking of the bundles is made easier for both the packer and unpacker because the beginning and ending of each bundle is readily identifiable allowing for expedited processing. Thus, an easier way to organize card bundles of signs produced by a printer production system is accomplished, i.e., visually as opposed to having to read a sign. The printed markings make the entire process easier from organizing the cards as they come off the production printer system, to the person unpacking and processing the packages of bundled cards at an end location.

Figure 4:
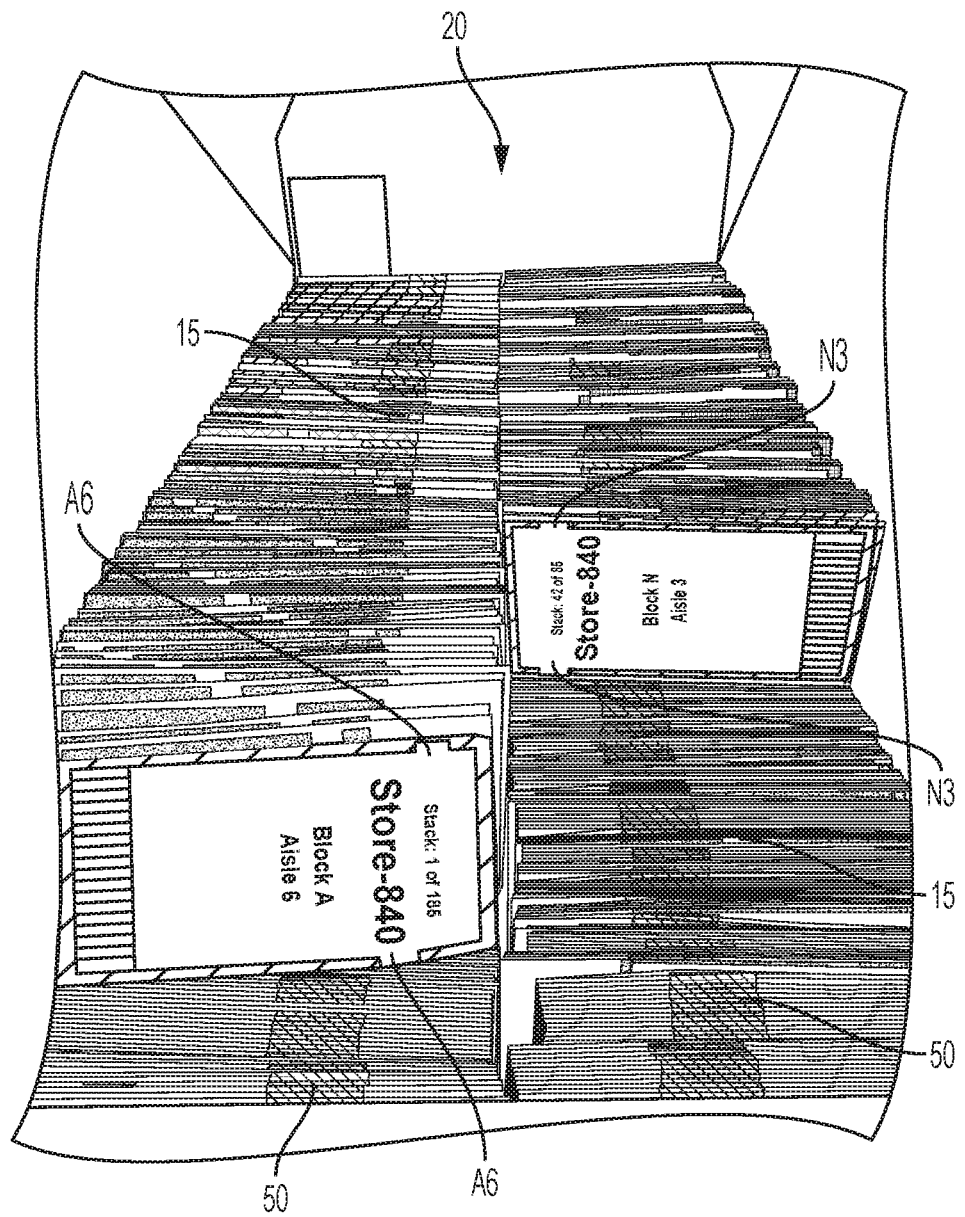
FIG. 4 is a perspective view of color coded sign bundles of FIG. 3 showing each bundle including index markings.

In FIG. 4, indexing is shown added to the cross-hatched coding of each bundle in box 20 to specify the positioning in each isle of the department store in order to speed up manually placing signs onto shelving. The indexing of each bundle is positioned diagonally for ease of reading and expediting their processing. A further enhancement to packing and unpacking the coded bundles includes wrapping each coded bundle with shrink wrap material 50 for ease of handling while simultaneously maintaining bundle integrity.

Figure 5:
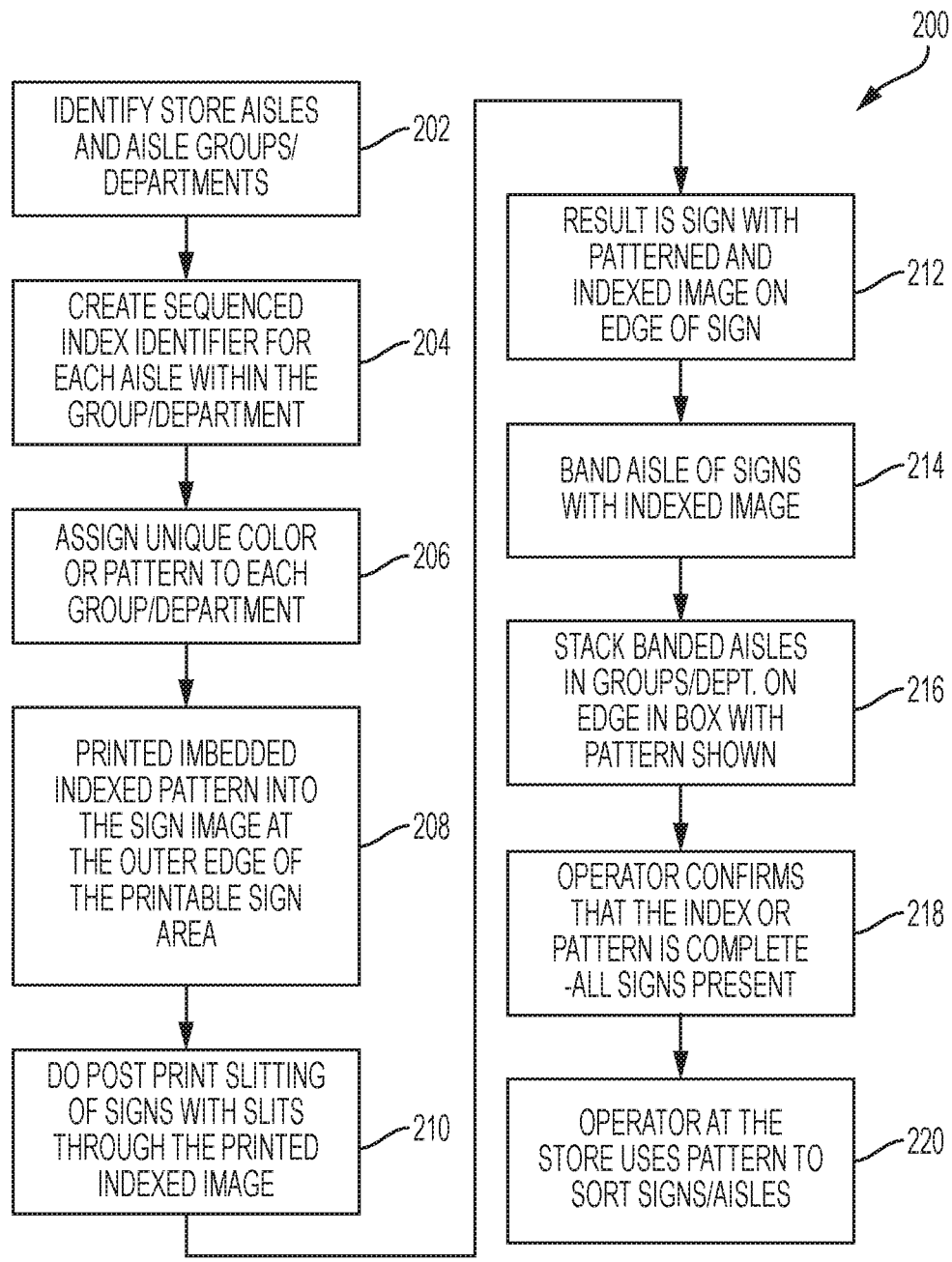
FIG. 5 is a flow chart showing the process of making and using signs marked in bundles.

A flow chart 200 in FIG. 5 shows the process of how the cards are marked and bundled. In practice, in block 202 an assessment is made to identify the department and aisle groups that will require card signs in a store. Once this is done, in block 204 a sequenced index identifier is created for each aisle group and a unique color or pattern in block 206 is assigned to each group. Sheets 12 containing card signs are then printed in block 208 with an imbedded color or pattern in the outer edge of the printable sign area. The sheets of card signs in block 210 are then conveyed to a series of slitters that slit through the printed indexed images resulting in block 212 in individual card signs with patterned or colored codes on their edges. The now individualized and separate card signs are then banded in block 214 by aisle and group with the indexed images showing. The banded card signs are then stacked in box 20 by group/department on edge with the pattern showing in block 216. An operator confirms in block 218 that the pattern and index are complete with all signs present and in block 220 uses the pattern to sort signs for particular aisles.

In recapitulation, an improved workflow process for packing and unpacking bundles of card signs is disclosed that include using printing to identity groups of printed card signs that include markings on the card signs for organizing the signs into groups and placing the signs into a box on their edge so that the printed markings are easily seen. The printed markings make the entire process easier for organizing the sign bundles as they come off a production printer system to the person packing and the person unpacking and processing the packages of bundled card signs. This workflow process improves packing and unpacking sign bundles and reduces labor time and costs that otherwise result from disorganized packing.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. A workflow process for packing and unpacking of groups of printed signs that are to be placed onto store shelving, comprising:
    providing a printer that includes a computer capable of receiving digital instructions and executing the same;
    printing signs on sheets that include paper onto which sales strip images of multiple cards are printed, said sheets including a clear polymer carrier that adds strength to said sheets;
    configuring said sales strip images to not extend into predetermined areas of said clear polymer carrier in order to allow that portion of said clear polymer carrier to be used for attaching to said store shelving;
    using said computer to cause said printer to print to outer edges of printable area of said signs;
    printing a different color code markings on said outer edges of selected ones of said signs;
    providing bundles of said signs with each bundle including a different color code printed on said outer edge of said signs;
    providing a box; and
    packing said bundles of signs into said box in rows and on edge so that said color code markings are readily recognizable.

2. The workflow process of claim 1, including shrink wrapping each color coded bundle of signs.

3. The workflow process of claim 1, including providing indexing printed on each of said signs within each of said bundles indicating separate groupings.

4. The workflow process of claim 3, wherein said color code markings are exposed only after a post print slitting operation.

5. The workflow process of claim 4, including using said color coded marking and indexing to identify the beginning and end of said bundles and groupings.

6. The workflow process of claim 5, wherein said bundles of printed signs are in multiple sizes.

7. A method for identifying particular bundles of printed cards while packing and unpacking the bundles, comprising:
provide a printer;
using said printer to print a sheet containing multiple card images thereon, said sheet including a clear polymer carrier for strength;
preventing said multiple card images from extending into predetermined areas of said clear polymer carrier in order to allow said predetermined areas of said clear polymer carrier to be used for store shelf attachment;
using said printer to place a pattern onto a selected one of said multiple card images on said sheet with said pattern being placed onto at least one edge of said selected card image;
slitting said sheet containing multiple card images thereon into individual cards;
using said printer to provide multiple sheets containing multiple card images thereon and slitting said sheets containing multiple card images thereon into individual cards;
using said pattern to organize said cards into bundles;
using said pattern to place said bundles into a box in rows and on an edge with said at least one edge and pattern showing; and
using said pattern on said cards of said bundles to expedite packing and unpacking said bundles.

8. The method of claim 7, including providing each bundle of printed cards with indexing.

9. The method of claim 8, including diagonally indexing groups of printed cards within said bundle of printed cards.

10. The method of claim 9, including providing said pattern as cross-hatching.

11. The method of claim 7, including providing said pattern as a color code.

\* \* \* \* \*